United States Patent

Kirschner

[15] 3,694,710

[45] Sept. 26, 1972

[54] VARIABLE CAPACITANCE MULTILAYERED CERAMIC CAPACITOR

[72] Inventor: John G. Kirschner, Northbrook, Ill.

[73] Assignee: P. R. Mallory and Co. Inc., Indianapolis, Ind.

[22] Filed: April 13, 1970

[21] Appl. No.: 27,574

Related U.S. Application Data

[63] Continuation-in-part of Ser. No. 876,969, Nov. 14, 1969.

[52] U.S. Cl. ....................................317/261, 29/25.42

[51] Int. Cl. ..............................................H01g 1/00

[58] Field of Search...317/261, 258, 249 R; 29/25.42

[56] References Cited

UNITED STATES PATENTS

| | | |
|---|---|---|
| 3,400,312 | 9/1968 | Dornfeld et al....317/249 R X |
| 3,444,436 | 5/1969 | Coda .....................317/261 X |
| 3,466,513 | 9/1969 | Belko, Jr. et al...........317/258 |

FOREIGN PATENTS OR APPLICATIONS

| | | |
|---|---|---|
| 507,143 | 6/1939 | Great Britain.............317/261 |
| 1,180,928 | 2/1970 | Great Britain.............317/261 |

*Primary Examiner*—Darrell L. Clay
*Attorney*—Richard H. Childress, Robert F. Meyer and Henry W. Cummings

[57] ABSTRACT

A multilayered ceramic capacitor, particularly a multilayered ceramic chip capacitor which can be varied in capacitance, primarily for use in hybrid integrated circuits. The capacitor's body includes a plurality of alternate ceramic and inner electrode layers. Outer termination portions, on the oppositely opposed surfaces of the body, electrically connects alternate inner electrode layers. Overlying the outer termination layer portions on one of said oppositely opposed surfaces is a ceramic layer having an external counterelectrode layer surface. The capacitor can be varied in capacitance by varying the surface area of the counterelectrode.

5 Claims, 3 Drawing Figures

INVENTOR
JOHN G. KIRSCHNER

VARIABLE CAPACITANCE MULTILAYERED CERAMIC CAPACITOR

This application is a continuation-in-part application of application Ser. No. 876,969, filed Nov. 14, 1969.

This invention relates to multilayered ceramic electrical components and, more particularly, to multilayered ceramic chip capacitors which can be varied in capacitance.

Miniature chip capacitors and other chip components are useful primarily in connection with hybrid integrated circuits and microminiaturized printed circuits. Ceramic chip capacitors provide higher capacitance values than those attainable in monolithic integrated circuits. In order to meet its intended uses, a chip capacitor should enclose a high electrical capacitance within a small volume; it should also be capable of simple and inexpensive manufacture. Additionally, hand positioning and assembly of the capacitors into a circuit should be eliminated to the greatest possible extent. Furthermore, since such components are essentially custom-made in batches to a circuit manufacturer's capacitance, voltage, size and shape requirements, tooling and set-up costs should be low.

Such capacitors as the foregoing, however, must be manufactured with fairly exacting capacitance requirements or when used, for example, in tuned circuits as filters, oftentimes require that the coil of the circuit be tuned since the capacitor has a fixed capacitance value. In such instances, it can be appreciated that the ability to vary the capacitance of the capacitor would represent a decided improvement an advantage in this art.

It is therefore an object of the present invention to provide multilayered ceramic chip capacitors which, in addition to other advantages, can be varied in capacitance.

It is another object of the present invention to provide multilayered chip capacitors having coplanar electrodes for direct assembly onto printed or integrated circuits and which, in addition to other advantages, can be varied in capacitance.

Other objects and advantages, as well as modifications obvious to one skilled in the arts to which the invention pertains, will become apparent from the following description and claims taken in conjunction with the accompanying drawings, in which:

In general, the present invention is directed to various aspects, both individually and collectively, of a multilayered ceramic capacitor having a body containing a plurality of alternate ceramic and inner electrode layers; outer termination portions, on the oppositely opposed surfaces of the body, electrically connecting alternate inner electrode layers; and, overlying the outer termination portions on one of the oppositely opposed surfaces, a ceramic layer having an external counterelectrode layer surface with the surface area of the counterelectrode capable of being varied in order to vary the capacitance of the capacitor, all as more fully discussed hereinafter.

The ceramic materials which can be employed include one or more ceramic constituents such as barium, calcium, lead and/or strontium titanates with or without the addition of zirconates of the above mentioned metals and titanium dioxide. These usually produce ceramics of relatively high dielectric constant generally desirable for relatively high capacitance capacitors. For certain purposes, ceramics of much lower dielectric constant may be desirable and typical of such materials are aluminum oxide and magnesium orthosilicate. Generally preferred, however, is a ceramic of the barium titanate based type.

Metals which can be employed as electrodes, termination portions and counterelectrodes include metallic conductors and their alloys. Preferably such metals should not deleteriously react or alloy with the constituents, such as the metallic constituents, of the ceramic material. Typical metals include high temperature metals and alloys which have melting points at or above the sintering temperature of the ceramic material such as refractory metals, i.e., tungsten, molybdenum and the like, and alloys containing such, and the noble metals such as palladium, platinum, gold and silver and alloys containing such.

Figure 1:
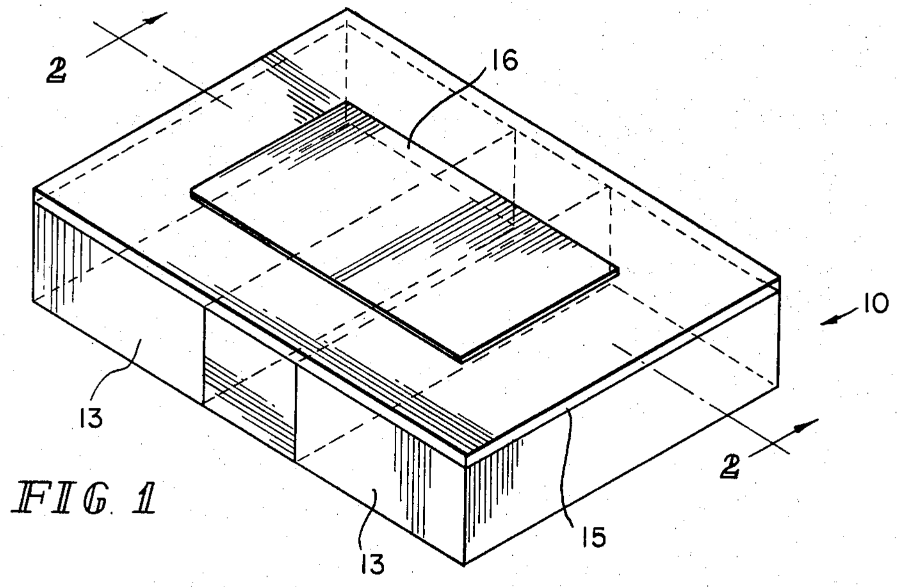
FIG. 1 is a perspective view of a ceramic embodiment of the present invention.
Figure 2:
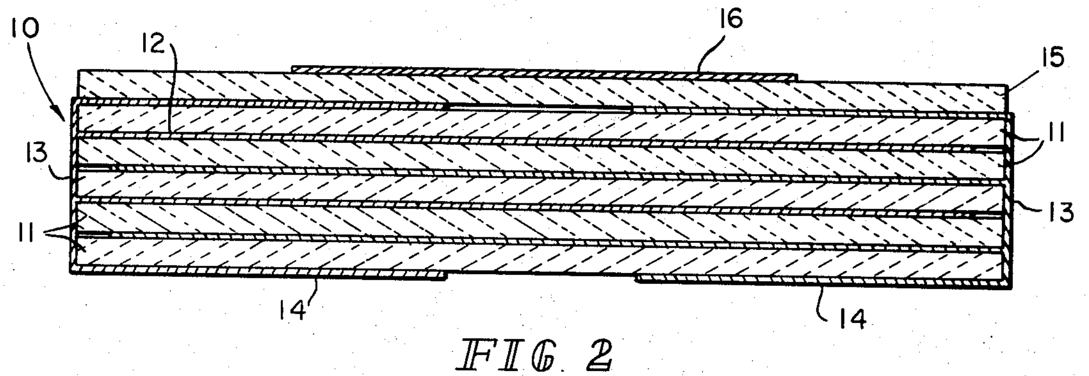
FIG. 2 is a sectional view of the embodiment of FIG. 1 taken along axis 2—2'.

Referring to the drawings and, more particularly, FIGS. 1 and 2, a ceramic embodiment of the present invention is shown. A multilayered ceramic capacitor is provided with a body 10 which is composed of a plurality of ceramic layers 11, each being separated from the adjacent ceramic layer by an inner electrode layer 12. The inner electrode layer extends substantially over the interface between the adjacent ceramic layers but does not extend to the end of the ceramic layers. The inner electrode layers alternate in their extension to the oppositely opposed ends of the ceramic layers and the alternate inner electrode layers are electrically connected by outer termination or electrode layer portions 13 thus providing alternate polarity electrodes over substantially all of a ceramic layer 11 therebetween. The ceramic layers and inner electrode layers are preferably in substantially parallel planes and the outer termination layer portions usually encase each end of the ceramic body as well as provide electrode portions 14 for attachment into electrical circuitry. On one side of the body 10 is a ceramic layer 15 which is substantially the same shape as ceramic layers 11 and which is provided with a metallic counterelectrode layer 16. The ceramic layer 15 and counterelectrode 16 are preferably in substantially parallel planes to the planes of the ceramic layers 11 and inner electrode layers 12. The ceramic layers 11 and ceramic layers 15 are usually of the same relative thickness and ceramic composition although such can vary in thickness and composition. The ceramic layers can take many and various peripheral shapes which include a circle, a square or rectangle with or without round corners, polygon and the like. Preferred, however, is a rectangular shape.

The ceramic capacitors of the present invention can be prepared by many and various methods which include forming the ceramic body by conventional procedures such as building up alternate layers of ceramic and metallic paste or paint into a desired wafer or body which can be further cut into individual capacitor shapes and then heated to burn out the binder, if used, and sintering or firing for maturing the bodies.

The inner metallic electrode layers should, of course, be positioned in the manner hereinbefore described to provide substantial capacitive overlap between alternating electrode layers and thus produce a high capacitance per volume. Moreover, the counterelectrode layer can be applied, if desired, after firing. The formation of multilayered capacitors is well known in the art and forms no part of the present invention.

By varying the surface area of the counterelectrode which cover or overlays the ceramic layer 15, it is possible to vary the capacitance of the capacitor within limits. In general, the capacitance increases as the surface area of the counterelectrode increases. Preferably, the counterelectrode surface area should be positioned on the ceramic layer in such a manner that it is substantially oppositely opposed to the electrode layer underlaying ceramic layer 15 in proportion to the surface area of the electrode layer. Thus, the counterelectrode is oppositely opposed to both portions of the electrode layer as well as the non-electroded portion therebetween.

In some instances, it is desirable to substantially cover the ceramic layer 15 with the metallic counterelectrode layer and then abrade or mechanically grind the metallic layer to a surface area which corresponds to a desired capacitance value for the capacitor. The metallic counterelectrode layer should be adjusted by removing a portion thereof which is oppositely opposed to the electrode layer underlaying ceramic layer 15. The removal can be in equal or unequal surface area portions to the surface area of the electrode layer. In this manner, it is possible to mass produce the capacitors and thereafter to individually adjust the capacitance to a desired value.

Figure 3:
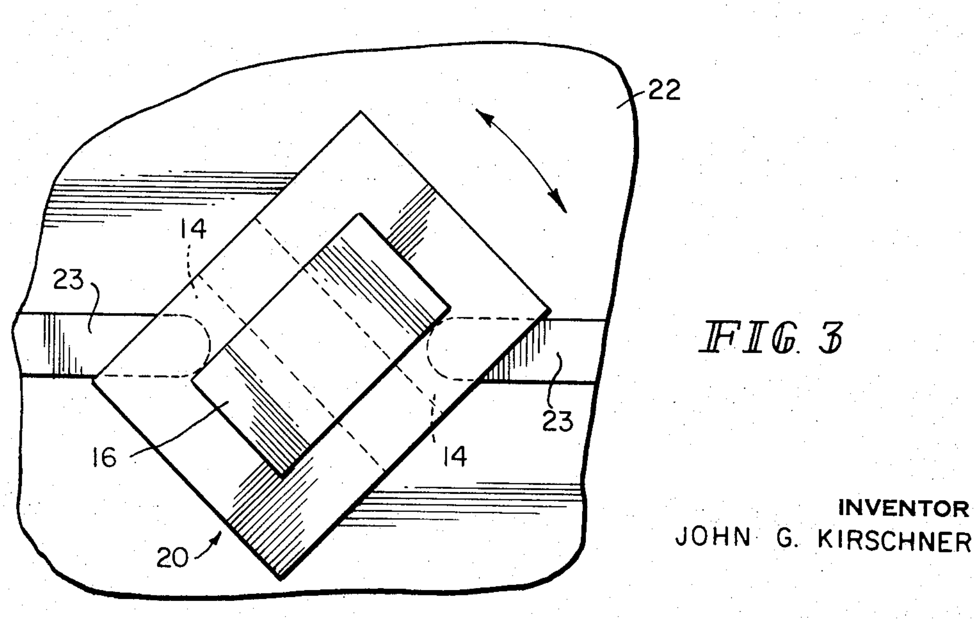
FIG. 3 shows the capacitor embodiment of FIG. 1 mounted in a circuit.

FIG. 3 shows a completed chip capacitor 20 positioned on the substrate 22 of a portion of hybrid integrated circuit or a miniature printed circuit. The capacitor 20 is placed face downward on the substrate 22 so that outer terminal layer portions 14 meet the contact pads 23 of the circuit; these elements are then soldered or joined by other conventional means. To avoid the handling of a multitude of small pieces, automatic means are commonly used in the industry to feed, position and orient such components. Rotational orientation about an axis perpendicular to the plane of the component may conveniently be accomplished with guides operating from a vibratory feeder. It will be noted from FIG. 3 that a quadrantal ambiguity in rotation of a square component in the direction of the arrow may be rendered harmless by diagonal mounting on the pads.

Chip capacitors according to the invention may vary greatly in size. A capacitor of the present invention can, for example, be about 15 mils thick. When the film forming process is used, generally a film thickness of about 4 to 7 mils is obtained. Therefore, the filmed layers can be stacked to form a laminated wafer of the desired thickness. A capacitor of the present invention can, for example, be about 60 mils square and such typically has a capacitance range of approximately 2 picofarads to 200 picofarads.

If desired, electrical leads can be connected to the outer termination portions by any conventional means such as soldering and the like and, in addition, the entire component may be coated or encapsulated with a protecting material such as a thermosetting plastic.

What is claimed is:

1. A multilayered ceramic capacitor comprising a body containing a top ceramic layer and a bottom ceramic layer with a plurality of alternate inner electrode layers and ceramic layers therebetween, a pair of oppositely opposed outer electrode layers, each of which overlays a portion of said top ceramic layer, extends along the edge of said body electrically connecting alternate inner electrode layers, and overlays a portion of said bottom ceramic layer, providing exposed electrode layers on said bottom ceramic layer for electrical connection into electrical circuitry and, overlaying said top ceramic layer and said portions of said outer electrode layers thereon, an additional ceramic layer having an external counterelectrode layer whereby the area of said counterelectrode layer can be varied to vary the capacitance of the capacitor.

2. A capacitor according to claim 1, wherein all of said ceramic layers, said electrode layers and said counterelectrode layer are substantially parallel.

3. A capacitor according to claim 2, wherein said counterelectrode layer extends over at least a portion of the outer end termination layer portions underlaying said additional ceramic layer.

4. A capacitor according to claim 3, wherein said counterelectrode layer is substantially proportional in surface area to the outer end termination layer portions underlaying said additional ceramic layer.

5. A capacitor according to claim 3, wherein said body has a rectangular shape.

* * * * *